US012726949B2

(12) United States Patent
Lyu et al.

(10) Patent No.: US 12,726,949 B2
(45) Date of Patent: Sep. 1, 2026

(54) COMMUNICATION METHOD AND COMMUNICATION DEVICE

(71) Applicant: QUECTEL WIRELESS SOLUTIONS CO., LTD., Shanghai (CN)

(72) Inventors: Ling Lyu, Shanghai (CN); Zhongzhi Yang, Shanghai (CN)

(73) Assignee: QUECTEL WIRELESS SOLUTIONS CO., LTD., Shanghai (CN)

( * ) Notice: Subject to any disclaimer, the term of this patent is extended or adjusted under 35 U.S.C. 154(b) by 286 days.

(21) Appl. No.: 18/600,180

(22) Filed: Mar. 8, 2024

(65) Prior Publication Data

US 2024/0214992 A1 Jun. 27, 2024

Related U.S. Application Data

(63) Continuation of application No. PCT/CN2021/127623, filed on Oct. 29, 2021.

(30) Foreign Application Priority Data

Sep. 9, 2021 (CN) ......................... 202111060008.3

(51) Int. Cl.
*H04W 72/02* (2009.01)
*H04L 1/08* (2006.01)
(Continued)

(52) U.S. Cl.
CPC ............... *H04W 72/02* (2013.01); *H04L 1/08* (2013.01); *H04L 1/1812* (2013.01); (Continued)

(58) Field of Classification Search
None
See application file for complete search history.

(56) References Cited

U.S. PATENT DOCUMENTS

2020/0267729 A1 8/2020 Kim et al.
2021/0105787 A1 4/2021 Park et al.

FOREIGN PATENT DOCUMENTS

CN 111328154 A 6/2020
CN 111436139 A 7/2020
(Continued)

OTHER PUBLICATIONS

International Search Report for PCT application No. PCT/CN2021/127623, dated May 26, 2022.
(Continued)

*Primary Examiner* — Suhail Khan
(74) *Attorney, Agent, or Firm* — Westbridge IP LLC

(57) ABSTRACT

The embodiments of the application provide a communication method and a communication device. The communication method comprises: determine the first time-frequency resource in a shared resource pool using the first resource allocation mode, send direct link data on the first time-frequency resource, and when no acknowledgment feedback for the direct link data is received, retransmit the direct link data using the first resource allocation mode and record the number of retransmissions. When the number of retransmissions reaches the first preset threshold, send the direct link data on the second time-frequency resource. Therefore, the embodiments of the application can help reduce the probability of conflicts or collisions between the terminal device and other terminal devices in time-frequency resources and are beneficial for improving the data transmission performance of terminal devices.

10 Claims, 4 Drawing Sheets

(51) Int. Cl.
*H04L 1/1812* (2023.01)
*H04W 72/044* (2023.01)
*H04W 72/0446* (2023.01)
*H04W 72/0453* (2023.01)
*H04W 72/40* (2023.01)

(52) U.S. Cl.
CPC ..... *H04W 72/044* (2013.01); *H04W 72/0446* (2013.01); *H04W 72/0453* (2013.01); *H04W 72/40* (2023.01)

(56) References Cited

FOREIGN PATENT DOCUMENTS

| | | | |
|---|---|---|---|
| CN | 112187417 | A | 1/2021 |
| CN | 112291836 | A | 1/2021 |
| CN | 112822777 | A | 5/2021 |
| CN | 112911546 | A | 6/2021 |
| WO | 2021010688 | A1 | 1/2021 |

OTHER PUBLICATIONS

First Office Action of CN application No. 202111060008.3, dated Apr. 12, 2023.

LG Electronics, “Discussion on resource allocation for power saving”, R1-2103378, 3GPP TSG RAN WG1 Meeting #104bis-e, Apr. 20, 2021.

LG Electronics Inc. “Power efficient resource allocation and Inter-UE coordination”, R2-2105467, 3GPP TSG-RAN WG2 Meeting #114-e, May 27, 2021.

Huawei, HiSilicon, R1-2007615, “Sidelink resource allocation to reduce power consumption”, 3GPP TSG RAN WG1 Meeting #103-e, Nov. 13, 2020.

COMMUNICATION METHOD AND COMMUNICATION DEVICE

CROSS REFERENCE TO RELATED APPLICATIONS

This application is a continuation of International Patent Application No. PCT/CN2021/127623, filed on Oct. 29, 2021, which claims the priority of Chinese Patent Application 202111060008.3, filed on Sep. 9, 2021. The entire contents of these patent application are incorporated by reference in this application.

TECHNICAL FIELD

The application relates to the field of communication, specifically a communication method and a communication device in the field of communication.

BACKGROUND

Vehicle to Everything (V2X) communication involves not only the information exchange between vehicles, but also the information exchange between vehicles and external systems, such as street lights, buildings, pedestrians and wireless communication networks. The V2X system enables the vehicle to obtain information related to weather, nearby accidents, road conditions, activities of nearby vehicles and pedestrians, and objects near the vehicle. This information can be used to improve the driving experience, increase vehicle safety, and provide services such as autonomous driving. With the increasing demand for V2X communication, the Third Generation Partner Project (3GPP) has also promoted NR V2X technology under the 5G New Radio (NR) system framework to meet the needs of automatic queuing driving, and support extended sensing, semi-automatic or fully automatic driving, and remote driving, enhancing the driving experience of vehicles.

In V2X technology, the direct sidelink (SL) resource allocation solution is one of the important factors affecting V2X performance. The 5G NR V2X supports three resource allocation modes to share the same resource pool, namely full sensing resource allocation mode, partial sensing resource allocation mode, and random resource selection mode.

Therefore, how to avoid conflicts and collisions between terminal devices with different resource allocation modes on time-frequency resources is an urgent challenge that needs to be solved.

SUMMARY

The application provides a communication method and a communication device which can help reduce the probability of conflicts or collisions between terminal devices in time-frequency resources, and are beneficial for improving the data transmission performance of terminal devices.

In the first aspect, the application provides a communication method, comprising:

- determining a first time-frequency resource in a shared resource pool using a first resource allocation mode;
- sending direct link data on the first time-frequency resource;
- when no acknowledged feedback of the direct link data is received, retransmitting the direct link data in a first resource allocation mode, and recording the number of retransmissions; and
- when the number of retransmissions reaches a first preset threshold, sending the direct link data on a second time-frequency resource.

In the second aspect, the application provides a communication method, comprising:

- receiving the direct link data on a second time-frequency resource, after the number of retransmissions on the first time-frequency resource reaches the first preset threshold, the direct link data is sent on the second time-frequency resource, the first time-frequency resource is determined through the first resource allocation mode; and
- processing the direct link data.

In the third aspect, the application provides a communication device, comprising:

- a processing unit, configured to determine the first time-frequency resource in a shared resource pool using the first resource allocation mode; and
- a transceiver unit, configured to transmit direct link data on the first time-frequency resource.

The transceiver unit is also used to retransmit the direct link data using the first resource allocation mode and record the number of retransmissions when no acknowledged feedback of the direct link data is received.

The transceiver unit is also used to send the direct link data on the second time-frequency resource when the number of retransmissions reaches the first preset threshold.

In the fourth aspect, the application provides a communication device comprising:

- a transceiver unit responsible for receiving direct link data on the second time-frequency resource. This direct link data is transmitted on the second time-frequency resource after the number of retransmissions of direct link data on the first time-frequency resource reaches the first preset threshold, and the first time-frequency resource is determined through the first resource allocation mode; and
- a processing unit, configured to process the direct link data.

In the fifth aspect, the application provides a communication device comprising a processor and a transceiver. Optionally, the communication device can also comprise a memory and a bus system. These components, namely the transceiver, memory, and processor, are interconnected through the bus system. The memory stores instructions, and the processor executes these instructions, including those stored in the memory. This execution enables the processor or the communication device to implement any method in the first aspect, its various executions, or any method in the second aspect, along with its potential executions.

In the sixth aspect, the application presents a communication system that comprises devices from the third aspect or any of its possible implementations, as well as devices from the fourth aspect or any of its potential implementations.

In the seventh aspect, the application provides a computer-readable medium for storing a computer program the computer program comprises instructions for executing a method in the first aspect and any possible execution of the first aspect, or instructions for executing a method in the second aspect and any possible execution of the second aspect.

In the eighth aspect, the application provides a computer program product, including computer program codes. When the communication device is running, the computer program codes enable the communication device to execute any method in the first aspect and any possible execution of the first aspect, or any method in the second aspect and any possible execution of the second aspect.

In the ninth aspect, the application introduces a chip applicable to communication devices. This chip comprises at least one processor. When the processor executes instructions, the chip or communication device can execute methods in the first aspect, its various implementations, or methods in the second aspect, and their potential executions.

Optionally, the chip may also comprise a memory that can be used to store the instructions involved.

Therefore, in the embodiments of the application, the terminal device adopts the first resource allocation mode to determine the first time-frequency resource. When the number of retransmissions of the direct link data on the first time-frequency resource reaches the preset threshold, the terminal device can continue to send the direct link data on the second time-frequency resource, which helps to reduce the probability of conflicts or collision between the terminal device and other terminal devices on the time-frequency resource and improve the data transmission performance of the terminal device.

DETAILED DESCRIPTION

The technical solution in the application is described in the following in conjunction with the figures.

The technical solution of the embodiment of the application can be applied to long term evolution (LTE) systems, Wi-Fi systems, 5th generation (5G) mobile communication systems, new radio (NR) or future evolving mobile communication systems. The embodiments of this application do not restrict the specific mobile communication systems being applied.

The terminal device in the embodiment of the application can also be referred to as a terminal, user equipment (UE), mobile station (MS), mobile terminal (MT), etc. The terminal devices can be sensors loaded on the vehicle in the V2X communication system, onboard terminals, wireless terminals in self-driving vehicles, wireless terminals in transportation safety, etc. The embodiments of the application do not limit the specific technology and device form adopted by the terminal device.

The wireless access network device in the embodiment of the application is a device deployed in the wireless access network to provide wireless communication functions for terminal devices. Wireless access network devices can encompass various forms of base stations, such as macro stations, micro base stations (small cells), relay stations, access points, new radio controllers (NR controllers), centralized units, radio frequency remote modules, distributed units, transmission reception points (TRPs), transmission points (TPs), or any other wireless access equipment, but the embodiments of this application are not limited to these. in systems using different wireless access technologies, the names of devices with base station functions may vary. For example, wireless access network devices can be access points (APs) in wireless local area networks (WLAN), evolved NodeB (eNB or eNodeB) in LTE systems, next generation NodeB (gNB) in 5G mobile communication systems and NR communication systems, or base stations in future mobile communication systems. The embodiments of this application do not impose limitations on the specific technology or device form adopted by wireless access network devices.

The application scenarios that the technical solution of the embodiment of the application can be applied to are briefly introduced in the following. It should be noted that the application scenarios described below are for illustration purposes and do not impose limitations on the embodiments of this application. In specific execution, the technical solution provided in the embodiments of the application can be flexibly applied according to actual needs.

Figure 1:
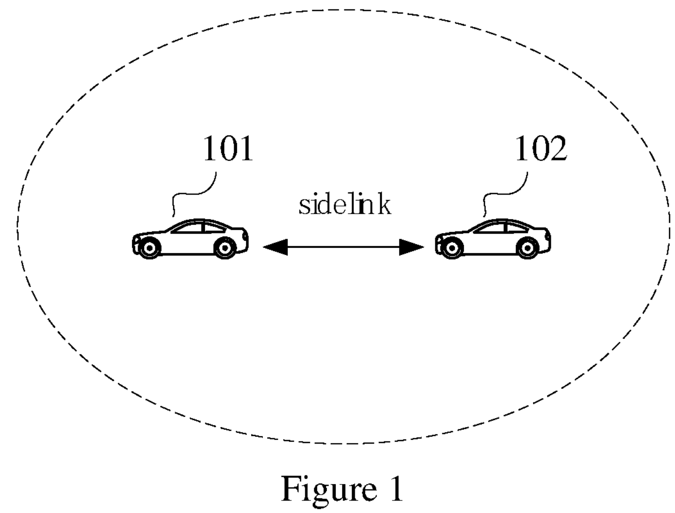
FIG. 1 is a schematic diagram of the communication system applying an embodiment of the application.

FIG. 1 is a schematic diagram of the communication system applicable to the embodiment of the application. As shown in FIG. 1, the onboard terminals (onboard terminal 101 and onboard terminal 102) can independently select transmission resources on the direct link for data transmission. Optionally, the onboard terminal can randomly select transmission resources or select transmission resources through monitoring. In the embodiments of the application, the direct link can also be referred to as a sublink or side link, and it is not limited.

In 5G NR V2X technology, three resource allocation modes are supported:

(1) Full Sensing Resource Allocation Mode

Figure 2:
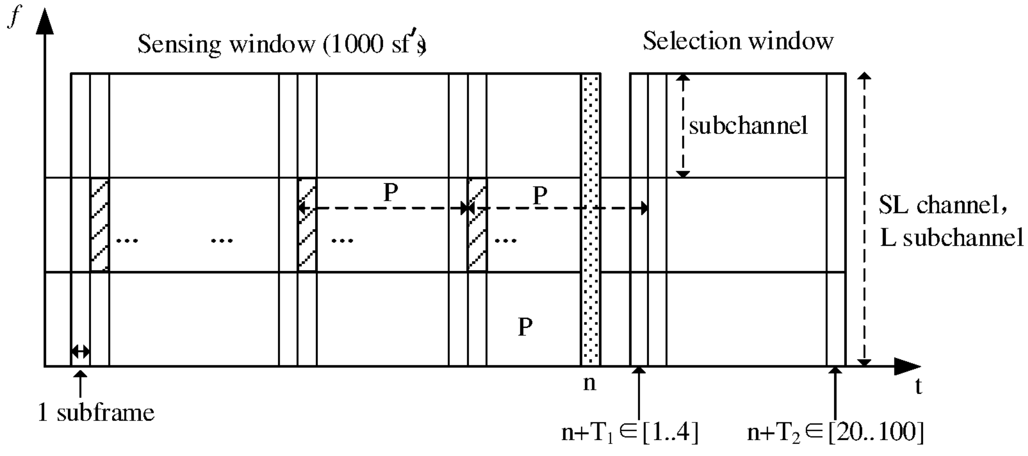
FIG. 2 is an example of the resource allocation mode provided in the embodiment of the application.

As shown in FIG. 2, when the terminal device receives higher-priority signaling triggering sensing in time slot n, resources in the $t_{y0}-t_{yn}$ time slot are determined as candidate time-frequency resources in the resource selection window, and sidelink control information (SCI) is monitored and decoded on the time-frequency resources corresponding to the candidate time-frequency resources in a longer sensing window $[n-T_1, n-T_2]$. Reference Signal Receiving Power (RSRP) is measured on the monitored time-frequency resources.

Here, n is the time slot number comprised in the SL resource pool, and the value of n can be greater than 1 and not greater than 100000. $T_{y0}-t_{yn}$ can be continuous or discontinuous time slots, and it is not limited. $T_1$ is the time length of the perception window, which can comprise a plurality of time slots, for example, $T_1$ can be any value in [0, 1000]. $T_2$ is the processing time length, which can be measured in time slots and is related to the size of the subcarrier interval, for example, it can be a value in $\{1,2,4\}$.

When the terminal device discovers that the RSRP value on the monitored time-frequency resource is greater than the given threshold, there is significant interference on that time-frequency resource. Based on the regular periodic communication of SL terminal devices, the terminal device will exclude candidate time-frequency resources corresponding to the resource selection window, thereby avoiding resource collisions and conflicts.

In addition, the full sensing resource allocation mode requires long-term and continuous monitoring by terminal devices, resulting in significant power consumption.

(2) Partial Sensing Resource Allocation Mode

Figure 3:
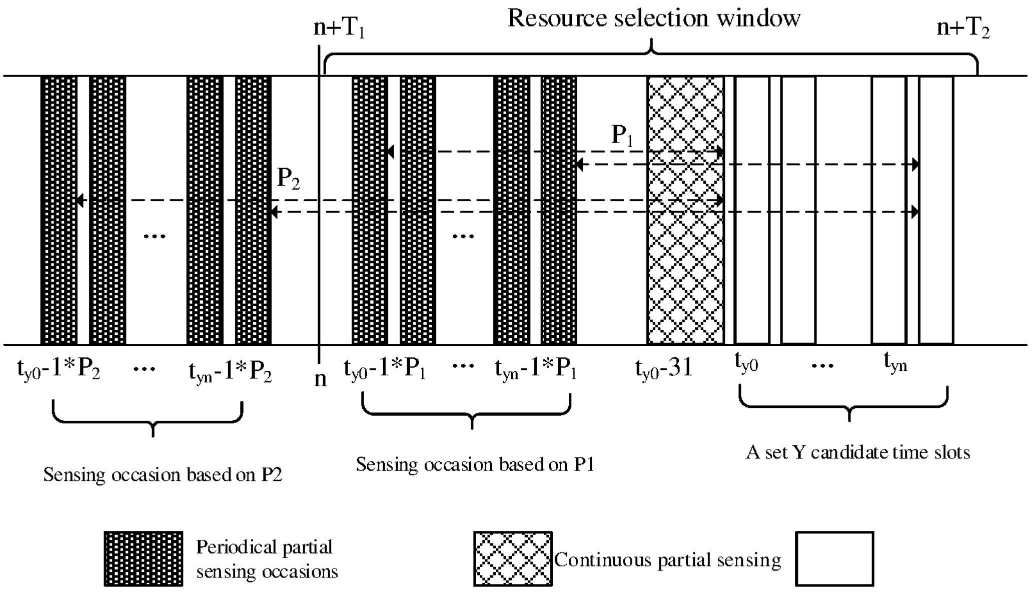
FIG. 3 is an example of another resource allocation mode provided in the embodiment of the application.

In this mode, the terminal device can monitor on some time-frequency resources. Partial sensing resource allocation modes can comprise:

Periodic-based Partial Sensing, which refers to the periodic intervals between sensed resources, can be seen in FIG. 3. Periodic partial sensing occasions comprise sensing occasions according to $P_2$ and sensing occasions according to $P_3$. That is, the monitoring resources for the $t_{y0}$ time slot are $t_{y0}-P_1$ and $t_{y0}-P_2$, where $P_1$ and $P_2$ represent two different periods.

Continuous Partial Sensing, which involves conducting short-term continuous monitoring before resource selection, is also shown in FIG. 3. The continuous sensing occasions start from $t_{y0}-T_3$, where $T_3$ is the time length of the continuous partial sensing window, which can be 31. In FIG. 3, the continuous sensing occasions end at $t_{y0}-T_4$, where $T_4$ is the processing time length of the continuous partial sensing, and its value is related to the subcarrier interval. For example, $T_4$ can be a non-negative integer, such as 0.

(3) Random Resource Selection Mode

Random resource selection mode means that the terminal device does not perform any monitoring and can randomly select time-frequency resources for data transmission in the resource selection window. In this mode, the power consumption of the terminal device is minimized. However, due to the lack of resource sensing by the terminal device, it may lead to a higher probability of resource collision or interference between terminal device and other terminal devices, resulting in poor transmission performance.

In the 5G NR V2X system, the terminal devices of the three resource allocation modes mentioned above share the same resource pool. In the same resource pool, when the terminal device (referred to as sensing terminal) that adopts the full sensing resource allocation mode or partial sensing resource allocation mode selects a batch of periodic time-frequency resources for data transmission after a period of sensing, the terminal device (referred to as a non-sensing terminal) that adopts the random resource selection mode does not perform sensing, resulting in this batch of time-frequency resources being randomly occupied. However, due to the higher data priority of the sensing terminal compared to the non-sensing terminal, the sensing terminals do not yield these time-frequency resources, which may lead to conflicts and collisions between the sensing terminal and the non-sensing terminal on this batch of time-frequency resources, thereby affecting the performance of the non-sensing terminal and the performance of the high priority sensing terminal.

In view of this, the embodiment of the application provides a communication method and device. When the terminal device adopts the first resource allocation mode to determine the first time-frequency resource and the number of retransmissions of direct link data on the first time-frequency resource reaches a preset threshold, the terminal device can continue sending the direct link data on the second time-frequency resource. In other words, the terminal device no longer needs to reevaluate the first time-frequency resource or use it for data transmission. This can help reduce the probability of conflicts or collisions between the terminal device and other terminal devices on time-frequency resources, thereby improving the data transmission performance of the terminal device.

Optionally, the terminal device can switch from the first resource allocation mode to the second resource allocation mode and use the second resource allocation mode to determine the second time-frequency resource. For example, the terminal device can switch from random resource selection mode to partial sensing resource allocation mode, or from partial sensing resource allocation mode to full sensing resource allocation mode, or from random source selection mode to full sensing resource allocation mode. The application does not limit these possibilities.

Figure 4:
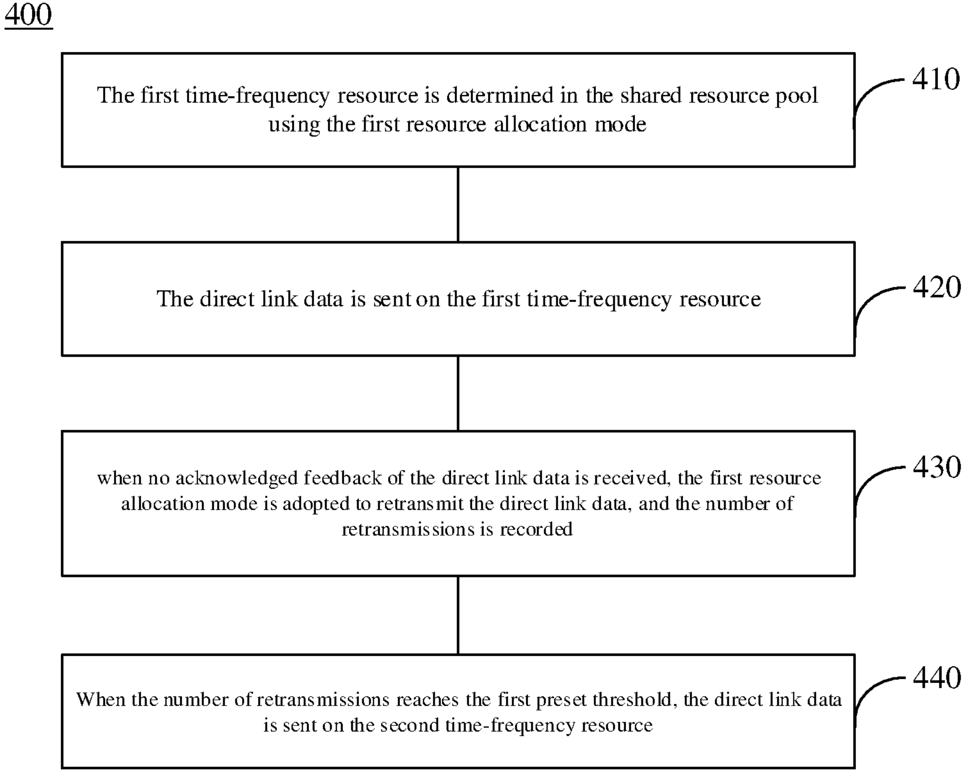
FIG. 4 is a schematic flowchart of the communication method provided in the embodiment of the application.

FIG. 4 is a schematic flowchart of the communication method 400 provided in the embodiment of the application. The method 400 can be executed by the terminal device or a chip or circuit set within the terminal device. For example, the terminal device may be the onboard terminal shown in FIG. 1, such as the terminal device 101 or terminal device 102. As shown in FIG. 4, the method 400 comprises steps 410 to 440.

410, the first resource allocation mode is used to determine the first time-frequency resource in the shared resource pool.

In some embodiments, the first resource allocation mode can be a random resource selection mode, where the terminal device can use the random resource selection mode to select time-frequency resources in the SL shared resource pool, such as the first time-frequency resource mentioned above. At this point, the terminal device can be referred to as a non-sensing terminal.

Optionally, prior to step 410, higher-priority signaling may be used to configure at least one of the shared resource pool, physical layer priority, retransmission threshold, and remaining packet delay budget (PDB).

For example, the higher-priority signaling can be configured by network devices such as base stations, or by a higher layer of the terminal device, which is not limited.

Different resource pools correspond to different resource allocation modes, so it can determine which mode the terminal device adopts for resource selection when configuring resource pools. Specifically, it can refer to the description above for resource allocation mode, which is not repeated here.

The physical layer priority can also be referred to as layer 1 (L1) priority, which can be used to determine the RSRP threshold in either full sensing resource allocation mode or partial sensing resource allocation mode.

The retransmission threshold can refer to the maximum number of retransmissions. In the embodiment of the application, when the number of times the terminal device transmits SL data using a resource allocation mode reaches the threshold of retransmissions, the terminal device can switch to another resource allocation mode for the transmission of the SL data. The threshold value for the number of retransmissions can be one or a plurality of, which is not limited.

The remaining PDB represents the latest time limit for the terminal device to send data, and it can be determined based on the latency requirements of the business.

Correspondingly, the terminal device can determine the mode of selecting time-frequency resources based on the shared resource pool of higher-priority signaling configuration. For example, in step 410, the terminal device may determine the use of a random resource selection mode to select time-frequency resources based on the higher-priority signaling configuration. Alternatively, in other embodiments, the terminal device may determine the use of partial sensing resource allocation mode or full sensing resource allocation mode based on higher priority signaling configuration to select time-frequency resources without limitation.

In other embodiments, the first resource allocation mode can be the partial sensing resource allocation mode, where the terminal device can adopt the partial sensing resource allocation mode in the SL shared resource pool to select time-frequency resources, such as the first time-frequency resource mentioned above.

420, the direct link data is sent on the first time-frequency resource.

430, when no acknowledged feedback of the direct link data is received, the first resource allocation mode is adopted to retransmit the direct link data, and the number of retransmissions is recorded.

Specifically, after step 420, the Hybrid Automatic Repeat reQuest (HARQ) feedback on the direct link can be monitored on the Physical Sidelink Feedback Channel (PSFCH). When the terminal device does not detect any acknowledged (ACK) feedback, the direct link data is retransmitted.

For example, when the first resource allocation mode is the random resource selection mode, due to the terminal device not performing any monitoring (or resource sensing), the probability of resource collision and interference with other terminal devices is high, resulting in poor transmission performance and frequent retransmission of direct link data.

The terminal device retransmits the direct link data. Specifically, the terminal device can still use the first resource allocation mode to continue sending the direct link data. For example, the terminal device can continue to repeat the above steps 410 to 430.

In 440, when the number of retransmissions reaches the first preset threshold, the direct link data is sent on the second time-frequency resource.

For example, the first preset threshold can be a threshold of retransmissions of high-priority signaling configuration received by the terminal device, or a threshold of retransmissions pre-defined by a protocol, which is not limited by the application. As a specific example, the first preset threshold can be 1, 2, 3, 4, or any other numerical value.

In other words, when the terminal device uses the first resource allocation mode and the number of retransmissions of the direct link data reaches a certain threshold, indicating that the terminal device is experiencing persistent resource collisions and conflicts. At this point, the terminal device can adaptively adjust the time-frequency resource selection to send the direct link data, which helps to reduce the performance impact of the terminal device on other terminal devices. For example, the terminal device can adaptively adjust its resource allocation mode, such as determining the switch from the first resource allocation mode to the second resource allocation mode, in order to select time-frequency resources.

In addition, if the terminal device does not experience retransmission when using the first resource allocation mode for direct link data transmission, or if the number of retransmissions is small, such as less than the first preset threshold mentioned above, the terminal device can still continue to use the first resource allocation mode for direct link data transmission.

As an example, when the first resource allocation mode is a random selection mode, the second resource allocation mode can be the partial perception resource allocation mode, such as periodic partial sensing or continuous partial sensing.

Figure 5:
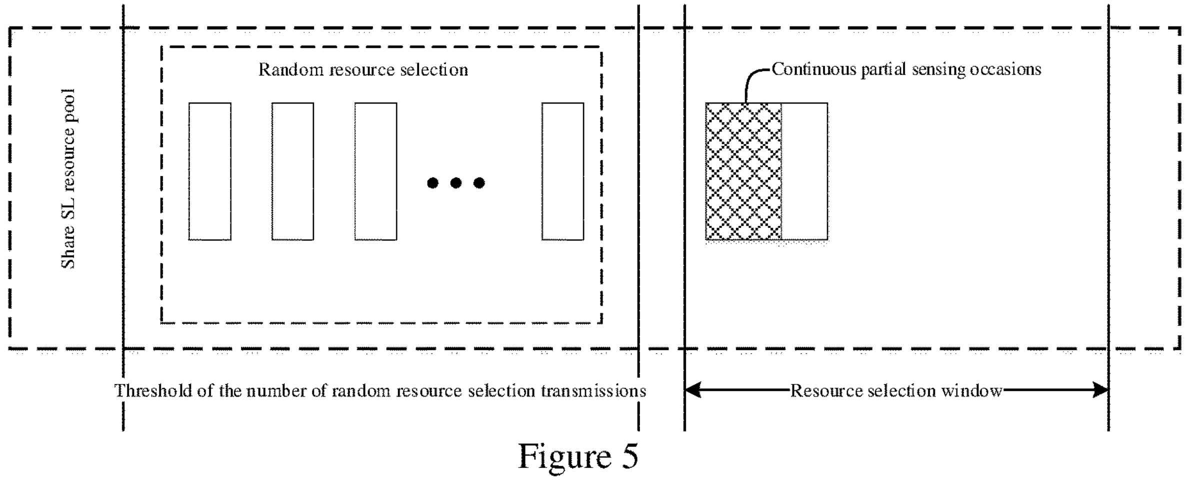
FIG. 5 is a schematic diagram of resource allocation mode switching provided in the embodiment of the application.

FIG. 5 shows the schematic diagram of resource allocation mode switching. As shown in FIG. 5, regarding the threshold of the number of random resource selection transmissions, when the number of times the direct link data is sent using the random selection mode reaches the preset threshold, the terminal device switches from the random resource selection mode to the continuous partial sensing resource allocation mode, and selects time-frequency resources in the resource selection window in FIG. 5, such as the shaded time-frequency resources in FIG. 5, to transmit the direct link data.

Therefore, when the number of times the terminal device uses random resource selection mode to retransmit the aforementioned direct link data reaches the first preset threshold, the terminal device suffers from persistent resource collisions and conflicts. At this point, the terminal device can adaptively adjust its resource allocation mode, such as switching from random resource selection mode to partial sensing resource allocation mode, in order to select time-frequency resources to send the direct link data, thereby helping to reduce the performance impact of the non-sensing terminal device on the sensing terminal device.

In addition, if the terminal device does not experience retransmission when using the random resource selection mode for direct link data transmission, or if the number of retransmissions is relatively small, such as less than the aforementioned first preset threshold mentioned above, the terminal device can still continue to use the random resource selection mode to transmit direct link data, which helps to reduce power consumption.

As another example, when the first resource allocation mode is the random selection mode, the second resource allocation mode can be a full sensing resource allocation mode.

That is to say, when adjusting the resource allocation mode adaptively, the terminal device can also switch from the random resource selection mode to full sensing resource allocation mode, thereby selecting time-frequency resources to send the direct link data, which helps to reduce the performance impact of the non-sensing terminal device on the sensing terminal device.

As another example, the first resource allocation mode comprises a partial sensing resource allocation mode, and the second resource allocation mode comprises a full sensing resource allocation mode.

That is to say, when the number of times the terminal device retransmits the aforementioned direct link data using partial sensing resource allocation mode reaches the first preset threshold, the terminal device suffers from persistent resource collisions and conflicts. At this point, the terminal device can continue to adaptively adjust its resource allocation mode. For example, it can switch from the partial sensing resource allocation mode to the full sensing resource allocation mode for time-frequency resource selection to transmit the direct link data. This adjustment helps reduce the performance impact of low-priority sensing terminal devices on high-priority sensing terminal devices.

In some optional implementations, if the second resource allocation mode is adopted and no acknowledgment feedback for the direct link data is received, the second resource allocation mode continues to be used for retransmitting the direct link data, and the number of retransmissions is recorded. When the number of retransmissions reaches the second preset threshold, the direct link data is sent on the third time-frequency resource.

For example, the second preset threshold can be a threshold of retransmissions of high-priority signaling configuration received by the terminal device, or a threshold of retransmissions pre-defined by a protocol, which is not limited by the application. As a specific example, the second preset threshold can be 1, 2, 3, 4, or any other numerical value.

In the embodiment of the application, the first preset threshold and the second preset threshold may be the same or different, which is not limited.

In a specific scenario, when the terminal device adaptively adjusts its resource allocation mode but still experiences persistent resource collisions and conflicts after switching from the first resource allocation mode to the second resource switching mode, the terminal device can continue to switch video resources. For instance, it can switch from the second time-frequency resource to the third time-frequency resource for time-frequency resource selection to transmit the direct link data, thereby reducing the impact of the terminal device on the performance of other terminal devices. For example, the terminal device can adaptively adjust its resource allocation mode, such as switching from the second resource allocation mode to the third resource allocation mode to select time-frequency resources.

For example, the second resource allocation mode comprises a partial sensing resource allocation mode, and the third resource allocation mode comprises a full sensing resource allocation mode.

Therefore, in the embodiments of the application, the terminal device adopts the first resource allocation mode to determine the first time-frequency resource. When the number of retransmissions of the direct link data on the first time-frequency resource reaches the preset threshold, the terminal device can continue to send the direct link data on the second time-frequency resource, which helps to reduce the probability of conflicts or collision between the terminal device and other terminal devices on the time-frequency resource and improve the data transmission performance of the terminal device.

In some optional embodiments, before determining to switch from the first resource allocation mode to the second resource allocation mode for time-frequency resource selection, it can determine that the sending time for the last retransmission of the direct link data using the first resource allocation mode is within the remaining PDB. That is to say, when the terminal device reaches a certain threshold for the retransmission of direct link data using the first resource allocation mode and the last retransmission time is within the remaining PDB, it can determine to continue sending the direct link data on the second time-frequency resource.

In other optional embodiments, when it is determined that the sending time of the last retransmission of the direct link data using the first resource allocation mode is not within the remaining PDB, the sending of the direct link data can be cancelled.

Figure 6:
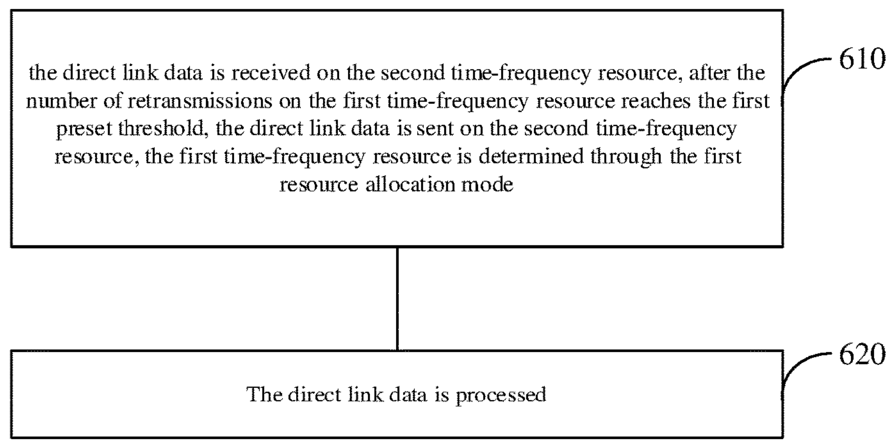
FIG. 6 is a schematic flowchart of another communication method provided in the embodiment of the application.

FIG. 6 shows a schematic flowchart of another communication method 600 provided in the embodiment of the application. The method 600 can be executed by the terminal device or a chip or circuit set within the terminal device. For example, the terminal device may be the onboard terminal shown in FIG. 1, such as the terminal device 101 or terminal device 102. As shown in FIG. 6, the method 600 comprises steps 610 and 620.

Step 610 involves receiving direct link data on the second time-frequency resource, where the direct link data is transmitted on the second time-frequency resource after reaching the first preset threshold for retransmissions on the first time-frequency resource. The first time-frequency resource is determined using the first resource allocation mode.

Step 620 entails processing the received direct link data.

In some optional embodiments, the second time-frequency resource is determined after switching from the first resource allocation mode to the second resource allocation mode.

In some optional embodiments, the first resource allocation mode comprises the random resource selection mode, and the second resource allocation mode comprises the partial sensing resource allocation mode.

In some optional embodiments, the first resource allocation mode comprises a partial sensing resource allocation mode, and the second resource allocation mode comprises a full sensing resource allocation mode.

In some optional embodiments, the first preset threshold is configured by high-priority signaling or pre-defined by the protocol.

It should be understood that the steps in method 600 can refer to the corresponding steps in communication method 400, which will not be repeated here to avoid repetition.

The specific embodiments of the application are described in detail above in conjunction with the drawings. However, the application is not limited to the specific details of the aforementioned embodiments. Within the scope of the technical concept of the application, the technical solution of the application may be subject to various simple variations, all of which shall fall within the scope of protection of the application. For example, without contradiction, the various specific technical features described in the above specific embodiments can be combined in any suitable way. In order to avoid unnecessary repetition, it will not separately explain various possible combination methods in the application. For example, as long as it does not violate the ideas of the application, various different execution methods of the application can also be combined arbitrarily, which should also be regarded as the content disclosed in the application.

It should also be understood that in the method embodiments of the application, the sequence number order of the above processes does not imply the order of execution. The execution order of each process should be determined by its function and internal logic, and should not constitute any limitation on the implementation process of any embodiment of the application.

In the preceding sections, the method embodiments of the application were described in detail in conjunction with FIGS. 1 to 6. In the following sections, the device embodiments of the application will be described in detail in conjunction with FIGS. 7 and 8.

Figure 7:
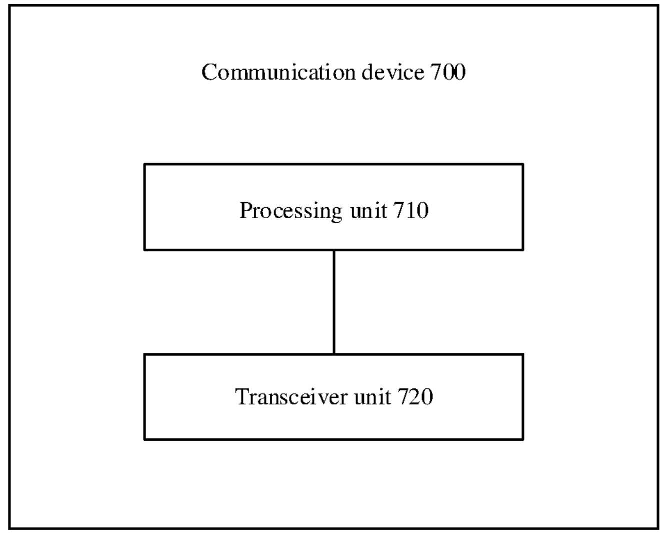
FIG. 7 is a schematic block diagram of the communication device provided in the embodiment of the application.

FIG. 7 is a schematic block diagram of the communication device 700 provided in the embodiment of the application. As shown in FIG. 7, the communication device 700 may comprise a processing unit 710 and a transceiver unit 720.

In some optional embodiments, the processing unit 710 is used to determine the first time-frequency resource in a shared resource pool using the first resource allocation mode. The transceiver unit 720 is responsible for transmitting direct link data on the first time-frequency resource. The transceiver unit 720 is also used to retransmit the direct link data using the first resource allocation mode and record the number of retransmissions when no acknowledged feedback of the direct link data is received. In addition, when the number of retransmissions reaches the first preset threshold, it sends the direct link data on the second time-frequency resource;

Optionally, the processing unit 710 is also used to determine to switch from the first resource allocation mode to the second resource allocation mode and use the second resource allocation mode to determine the second time-frequency resource.

Optionally, the first resource allocation mode comprises the random resource selection mode, and the second resource allocation mode comprises the partial sensing resource allocation mode.

Optionally, the first resource allocation mode comprises a partial sensing resource allocation mode, and the second resource allocation mode comprises a full sensing resource allocation mode.

Optionally, the processing unit 710 is also used to determine that the sending time of the last retransmission of the direct link data using the first resource allocation mode is within the remaining PDB.

Optionally, the first preset threshold is configured by high-priority signaling or pre-defined by the protocol.

It should be understood that device embodiments and method embodiments can correspond to each other, and similar descriptions can refer to method embodiments. It is not repeated here to avoid repetition. Specifically, in this embodiment, the communication device 700 can correspond to the corresponding entity that executes the method 400 of the embodiment of this application. The various modules and their operations and/or functions in the communication device 700 are designed to implement the various methods in FIG. 4 or the corresponding processes of the methods in FIG. 4. To avoid repetition, further details are not provided here for the sake of brevity.

In some optional embodiments, the transceiver unit 720 is used for receiving direct link data on the second time-frequency resource the direct link data is transmitted on the second time-frequency resource after the number of retransmissions of direct link data on the first time-frequency resource reaches the first preset threshold, and the first time-frequency resource is determined through the first resource allocation mode. The processing unit 710 is used for processing the direct link data.

Optionally, the second time-frequency resource is determined after switching from the first resource allocation mode to the second resource allocation mode.

Optionally, the first resource allocation mode comprises the random resource selection mode, and the second resource allocation mode comprises the partial sensing resource allocation mode.

Optionally, the first resource allocation mode comprises a partial sensing resource allocation mode, and the second resource allocation mode comprises a full sensing resource allocation mode.

Optionally, the first preset threshold is configured by high-priority signaling or pre-defined by the protocol.

It should be understood that device embodiments and method embodiments can correspond to each other, and similar descriptions can refer to method embodiments. It is not repeated here to avoid repetition. Specifically, in this embodiment, the communication device 700 can correspond to the corresponding entity that executes the method 600 of the embodiment of this application. The various modules and their operations and/or functions in the communication device 700 are designed to implement the various methods in FIG. 6 or the corresponding processes of the methods in FIG. 6. To avoid repetition, further details are not provided here for the sake of brevity.

The device and system of the embodiment of the application are described from the perspective of functional modules in conjunction with the drawings. It should be understood that the functional module can be realized through hardware, software instructions, or the combination of hardware and software modules. Specifically, in the method embodiments of this application, the steps can be completed through integrated logic circuits of hardware in the processor and/or software instructions. The steps of the methods disclosed in this application can be directly executed by a hardware decoding processor or through a combination of hardware and software modules in the decoding processor. Optionally, the software modules can be located in mature storage media in this field, such as random-access memory, flash memory, read-only memory, programmable read-only memory, electrically erasable programmable memory, registers, etc. The storage medium is located in the memory, and the processor reads the information in the memory and completes the steps of the above methods in combination with the hardware.

Figure 8:
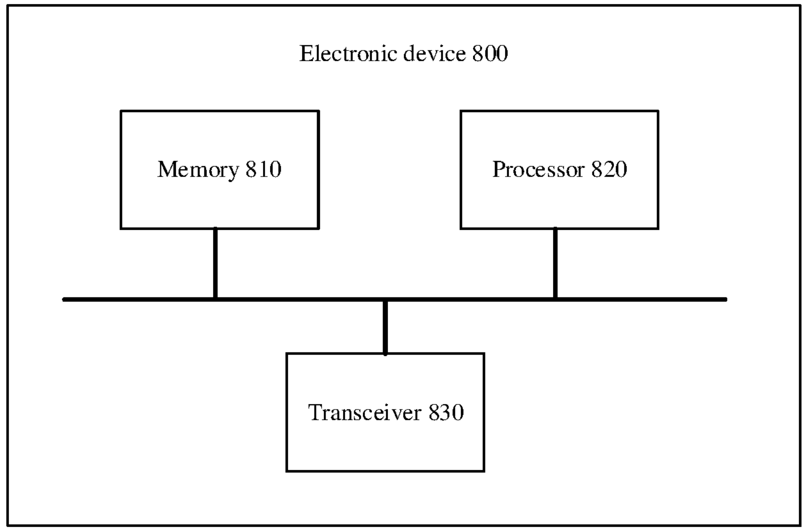
FIG. 8 is a schematic block diagram of the electronic device provided in the embodiment of the application.

FIG. 8 is a schematic block diagram of the electronic device 800 provided in the embodiment of the application.

As shown in FIG. 8, the electronic device 800 comprises: a memory 810 and a processor 820.

The memory 810 is used to store computer programs and transfer the program codes to the processor 820. In other words, the processor 820 can call and run a computer program from the memory 810 to execute the communication method in the embodiment of the application.

For example, the processor 820 can be used to execute the steps in method 400 or method 600 based on instructions in the computer program.

In some embodiments of the application, the processor 820 may comprise but is not limited to the following:

General-purpose processors, digital signal processors (DSPs), application specific integrated circuits (ASICs), field programmable gate arrays (FPGAs) or other programmable logic devices, discrete gates or transistor logic devices, discrete hardware components, etc.

In some embodiments of the application, the memory 810 comprises but is not limited to the following:

A volatile memory and/or a non-volatile memory. The non-volatile memory can be a read-only memory (ROM), a programmable read-only memory (PROM), an erasable programmable read-only memory (EPROM), an electrically erasable programmable read-only memory (EEPROM), or a flash memory. The volatile memory can be Random Access Memory (RAM) used as external high-speed cache. By way of example but not limiting description, many forms of RAMs are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink DRAM (SLDRAM), and direct rambus RAM (DR RAM).

In some embodiments of the application, the computer program may be divided into one or a plurality of modules, which are stored in the memory 810 and executed by the processor 820 to complete the encoding method provided in the application. The one or a plurality of modules can be a series of computer program instruction segments capable of performing specific functions, which are used to describe the execution process of the computer program in the electronic device 800.

Optionally, as shown in FIG. 8, the electronic device 800 may further comprise a transceiver 830.

The transceiver 830 can be connected to processor 820 or memory 810.

The processor 820 can control the transceiver 830 to communicate with other devices. Specifically, it can send information or data to other devices or receive information or data sent by other devices. The transceiver 830 can comprise a transmitter and a receiver. The transceiver 830 may further comprise one or a plurality of antennas.

It should be understood that the components in the electronic device 800 are connected through a bus system, which comprises not only a data bus, but also a power bus, a control bus and a status signal bus.

The application provides a communication device comprising a processor and a memory the memory is used to store computer programs, and the processor is used to call and run the computer programs stored in the memory to enable the encoder to execute the communication method of the above method embodiment.

The application also provides a communication system comprising the aforementioned communication device.

The application also provides a computer storage medium on which the computer program is stored, enabling the computer to execute the method embodiments described above when the computer executes the program. Alternatively, the embodiment of the application also provides a computer program product comprising instructions that, when executed by a computer, enable the computer to execute the aforementioned method embodiments.

The application also provides a computer program product or computer program, which comprises computer instructions stored in the computer-readable storage medium. The processor of the computer reads the computer instructions from the computer-readable storage medium, and the processor executes the computer instructions, enabling the computer to execute the aforementioned method embodiments.

In other words, when the software is used for execution, it can be fully or partially executed in the form of the computer program product. The computer program product comprises one or a plurality of computer instructions. When the computer program instructions are loaded and executed on a computer, they generate all or part of the processes or functions according to the embodiments described in this application. The computer can be a general-purpose computer, a specialized computer, a computer network, or any other programmable device. The computer instructions can be stored in a computer-readable storage medium or transferred from one computer-readable storage medium to another. For example, these computer instructions can be transmitted from one website, computer, server, or data center to another website, computer, server, or data center through wired methods (such as coaxial cable, fiber optic, digital subscriber line (DSL)) or wireless methods (such as infrared, wireless, microwave, etc.). The computer-readable storage medium can be any available medium that the computer can access, or any data storage device such as a server, data center, etc. that integrates one or a plurality of available media. The available media can be magnetic media (such as floppy disks, hard drives and magnetic tapes), optical media (such as digital video discs (DVDs)), or semiconductor media (such as solid state disks (SSDs)), etc.

The ordinary technicians in this field can realize that the modules and algorithm steps of each embodiment described in the disclosed embodiments can be executed in electronic hardware, or the combination of computer software and electronic hardware. These functions are executed by hardware or software based on the specific application and design constraints of the technical solution. Professional technicians may use different methods to achieve the described functions for each specific application, but it should not be considered beyond the scope of the application.

In the embodiments provided in the application, it should be understood that the disclosed systems, devices and methods can be implemented in other ways. Exactly, the device embodiments described are illustrative, and the division of modules is a logical function division. In actual implementation, there can be other ways of division, such as combining a plurality of modules or components, integrating them into another system, or ignoring or not executing certain features. Additionally, the coupling or communication connections mentioned can be achieved through indirect coupling or communication connections of interfaces, devices, or modules, and can take various forms, including electrical, mechanical, or other forms.

The modules mentioned as separate components can be physically separate or not, and the components displayed as modules can be physical modules or not. They can be located in one place or distributed across a plurality of network units. Some or all modules can be selected according to actual needs to achieve the purpose of the embodiment. For example, all functional modules in each embodiment of the application can be integrated into one processing module or can exist physically separately. It can also be two or a plurality of modules integrated into one module.

In conclusion, the above content represents specific embodiments of this application, but the scope of protection of this application is not limited to these embodiments. Any skilled person in the technical field, within the scope of technology disclosed in this application, can easily envision variations or substitutions, all of which should be covered within the scope of protection of this application. Therefore, the scope of protection of this application shall be determined by the scope of protection of the claims.

What is claimed is:

1. A method for communication, comprising:

determining a first time-frequency resource in a shared resource pool supporting a random resource selection mode, a partial sensing resource allocation mode and a full sensing resource allocation mode, using a first resource allocation mode;

sending direct link data on the first time-frequency resource;

when no acknowledged feedback of the direct link data is received, retransmitting the direct link data in the first resource allocation mode, and recording the number of retransmissions;

when the number of retransmissions reaches a first preset threshold, determining to switch from the first resource allocation mode to a second resource allocation mode;

determining a second time-frequency resource in the shared resource pool using the second resource allocation mode; and sending the direct link data on the second time-frequency resource.

2. The method according to claim 1, wherein the first resource allocation mode is a random resource selection mode, and the second resource allocation mode is a partial sensing resource allocation mode.

3. The method according to claim 1, according to claim 1, wherein the first resource allocation mode is a partial sensing resource allocation mode, and the second resource allocation mode is a full sensing resource allocation mode.

4. The method according to claim 1, wherein before sending the direct link data on the second time-frequency resource, the method further comprises:

determining that a sending time of the last retransmission of the direct link data using the first resource allocation mode is within a remaining packet delay budget (PDB).

5. The method according to claim 1, wherein the first preset threshold is configured by high-priority signaling or pre-defined by a protocol.

6. An electronic device, comprising a processor and a memory, wherein the memory stores instructions, which, when executed by the processor, causes the device to perform the method of claim 1.

7. A non-transitory computer-readable storage medium, configured to store a computer program, which instructs a processor to perform the method of claim 1.

8. A method for communication, comprising:

receiving direct link data on a second time-frequency resource, after a number of retransmissions on a first time-frequency resource reaches a first preset threshold, wherein the direct link data is sent on the second time-frequency resource, and the first time-frequency resource is determined in a shared resource pool supporting a random resource selection mode, a partial sensing resource allocation mode and a full sensing resource allocation mode, using a first resource allocation mode; and the second time-frequency resource is determined in the shared resource pool using a second resource allocation mode; and processing the direct link data.

9. A device for communication, comprising:

a processor, configured to determine a first time-frequency resource in a shared resource pool supporting a random resource selection mode, a partial sensing resource allocation mode and a full sensing resource allocation mode, using a first resource allocation mode;

a transceiver, configured to transmit direct link data on the first time-frequency resource;

wherein the transceiver is further configured to retransmit the direct link data using the first resource allocation mode and record the number of retransmissions when no acknowledged feedback of the direct link data is received;

wherein the processor is further configured to determine to switch from the first resource allocation mode to a second resource allocation mode, and determine a second time-frequency resource in the shared resource pool using the second resource allocation mode, when the number of retransmissions reaches a first preset threshold; and wherein the transceiver is further configured to send the direct link data on the second time-frequency resource.

10. A device for communication, comprising:

a transceiver, configured to receive direct link data on a second time-frequency resource, wherein the direct link data is transmitted on the second time-frequency resource after the number of retransmissions of the direct link data on a first time-frequency resource reaches a first preset threshold, and the first time-frequency resource is determined in a shared resource pool supporting a random resource selection mode, a partial sensing resource allocation mode and a full sensing resource allocation mode, using a first resource allocation mode, and the second time-frequency resource is determined in the shared resource pool using a second resource allocation mode; and a processor, configured to process the direct link data.

* * * * *